United States Patent [19]

Magara et al.

[11] Patent Number: 5,021,622
[45] Date of Patent: Jun. 4, 1991

[54] WIRE CUT ELECTRICAL DISCHARGE MACHINE

[75] Inventors: Takuji Magara; Toshio Suzuki, both of Aichi, Japan

[73] Assignee: Mitsubishi Denki Kabushiki Kaisha, Tokyo, Japan

[21] Appl. No.: 224,853

[22] PCT Filed: Oct. 23, 1987

[86] PCT No.: PCT/JP87/00814
§ 371 Date: Aug. 17, 1988
§ 102(e) Date: Aug. 17, 1988

[87] PCT Pub. No.: WO88/03071
PCT Pub. Date: May 5, 1988

[30] Foreign Application Priority Data

| Oct. 24, 1986 | [JP] | Japan | 61-252918 |
| Oct. 24, 1986 | [JP] | Japan | 61-252921 |
| Oct. 24, 1986 | [JP] | Japan | 61-252922 |
| Oct. 24, 1986 | [JP] | Japan | 61-252923 |
| Oct. 24, 1986 | [JP] | Japan | 61-252924 |
| Oct. 24, 1986 | [JP] | Japan | 61-252925 |
| Oct. 24, 1986 | [JP] | Japan | 61-252926 |
| Oct. 24, 1986 | [JP] | Japan | 61-252927 |
| Oct. 24, 1986 | [JP] | Japan | 61-252947 |

[51] Int. Cl.⁵ .............................................. B23H 7/06
[52] U.S. Cl. .................................................. 219/69.12
[58] Field of Search .............. 219/69.13, 69.16, 69.17, 219/69.12

[56] References Cited

U.S. PATENT DOCUMENTS

| 4,292,491 | 9/1981 | Tanaka et al. | 219/69.12 |
| 4,465,914 | 8/1984 | Obara | 219/69.12 |
| 4,495,038 | 1/1985 | Inoue | 219/69.12 |
| 4,581,513 | 4/1986 | Obara et al. | 219/69.14 |
| 4,649,252 | 3/1987 | Obara | 219/69.12 |

FOREIGN PATENT DOCUMENTS

| 0084735 | 8/1983 | European Pat. Off. | 219/69.17 |
| 0028926 | 5/1985 | European Pat. Off. | |
| 2635766 | 3/1977 | Fed. Rep. of Germany | |
| 2932734 | 3/1980 | Fed. Rep. of Germany | |
| 2942202 | 9/1980 | Fed. Rep. of Germany | |
| 5413096 | 6/1977 | Japan | |
| 20496 | 2/1979 | Japan | |
| 54-137196 | 10/1979 | Japan | |
| 57-66827 | 4/1982 | Japan | 219/69.17 |
| 82/02356 | 7/1982 | PCT Int'l Appl. | 219/69.12 |
| 639886 | 12/1983 | Switzerland | |

Primary Examiner—Geoffrey S. Evans
Attorney, Agent, or Firm—Sughrue, Mion, Zinn, Macpeak & Seas

[57] ABSTRACT

A wire cut electrical discharge machine includes a control device which corrects a change in the electrode side gap due to a change in the amount of removal in accordance with information relating to the machining operation provided beforehand and information indicating a current machining position and a current machining condition, thereby to improve the machining accuracy at the corner portion of the workpiece.

9 Claims, 13 Drawing Sheets

WIRE CUT ELECTRICAL DISCHARGE MACHINE

BACKGROUND OF THE INVENTION

The present invention relates to a wire cut electrical discharge machine, and in particular, to an improved wire cut electrical discharge machine having a higher accuracy.

FIG. 1 is a schematic diagram showing an arrangement of a prior art wire cut electrical discharge machine.

In the Figure, reference numeral 1 designates a wire-form electrode, 2 a workpiece, 3 an X-slider for moving the workpiece 2 in right-left directions as viewed in the FIG. 4 a Y-slider for moving the workpiece 2 in front-back directions as viewed in the FIG. 5 a servomotor for driving the X-slider, 6 a servomotor for driving the Y-slider 4, 7 a servo-amplifier for supplying a current to the servomotor 5, 8 a servo-amplifier for supplying a current to the servomotor 6, 9 a power supply for machining for applying a pulse-shaped voltage between the wire-form electrode 1 and the workpiece 2, 10 a detector for detecting an average machining voltage applied between the wire-form electrode 1 and the workpiece 2, and 11 a control unit for controlling the servo-amplifiers 7 and 8 in accordance with a signal from the detector 10 and a predetermined machining program.

Next, the operation will be described. The machining is performed by travelling the wire-form electrode 1 at a predetermined speed, by applying the pulse-shaped voltage between the wire-form electrode 1 and the workpiece 2 from the power supply for machining 9, and producing a discharge between the wire-form electrode 1 and the workpiece 2. In this case, movement command signals are transmitted to the servo-amplifiers 7 and 8 in accordance with a programmed locus provided to the control unit 11 beforehand, and the servo-motors 5 and 6 respectively control the X-slider 3 and the Y-slider 4 thereby to machine the workpiece 2 to a desired shape. Generally, since the machining condition changes frequently, the control unit 11, in accordance with an average voltage between the poles (anode and cathode) detected by the detector 10, drives the X-slider 3 and Y-slider 4 at optimum feed speeds so that the machining clearance between the wire-form electrode 1 and the workpiece 2 becomes constant. Normally, it is possible to obtain a satisfactory geometry accuracy and face roughness by performing face finishing several times after roughing. In this respect, the geometry accuracy after the finishing is determined by the electrode side gap (clearance between the side of the electrode and the workpiece). For this reason, in order to achieve the shape machining with a high accuracy, it is necessary to maintain the electrode side gap at a constant value.

FIG. 2 is an enlarged view of the wire-form electrode 1 and the workpiece 2 during the finishing. In a conventional, usual manner of control of the average voltage at a constant value, the machining speed U decreases when the amount of removal L is increased. As a result of this, the machining integral effect at a side portion of the wire (a portion D in FIG. 2) increases and the electrode side gap $g_s$ increases. In other words, even when the machining electrical conditions and the average servo-voltage are maintained unchanged, if the amount of removal L is changed, the electrode side gap $g_s$ will not be held constant resulting in the degradation of the geometry accuracy after finishing. FIG. 3 shows a relationship between the amount of removal L and the electrode side gap $g_s$ when the machining electrical conditions and the average servo-voltage are not changed. It will be seen from the Figure that the electrode side gap $g_s$ changes to a great extent depending on a change in the amount of removal L. In actual shape machining, a change in the amount of removal L becomes maximum at a corner portion of the workpiece. FIG. 4 is an enlarged view of the wire-form electrode 1 and the workpiece 2 during incorner machining, where R is a wire radius, r is a face of the previous machining, r' is a radius of a wire locus, $L_0 \sim L_5$ indicate the amount of removal at each of wire center positions $O_0 \sim O_5$. It will be seen from the Figure that the amounts of removal $L_2 \sim L_4$ at the corner portion change to large values as compared with the amounts of removal $L_0$ and $L_5$ during straight machining. FIG. 5 illustrates a change in the amount of removal L at the incorner portion of the workpiece. In the Figure, the amount of removal L begins to increase at a certain distance H1 before the beginning of the corner portion, and it is maintained at a constant value for a while. Then the amount of removal L begins to decrease at a certain distance H3 before the end of the corner portion, and it reaches again the amount of removal at the straight machining portion of the workpiece. As described in the foregoing, in particular at the incorner portion, since the enlargement of the electrode side gap $g_s$ occurs due to the increase in the amount of removal L, the geometry of the workpiece after machining is degraded to a great extent as shown in FIG. 6 wherein d represents the amount of overcut. Moreover, at the outcorner portion of the workpiece, since the decrease of the electrode side gap $g_s$ occurs due to the decrease in the amount of removal L, the geometry of the workpiece after machining is likewise degraded.

Because the prior art wire cut electrical discharge machine is arranged as described above, problems are involved in that the wire electrode side gap is changed due to a change in the amount of removal occurring in particular at the corner portion and the like of the workpiece, and consequently the accuracy of the geometry after machining is degraded to a great extent.

SUMMARY OF THE INVENTION

An object of the present invention is to provide a novel wire cut electrical discharge machine having an excellent machining accuracy.

Another object of the present invention is to provide a wire cut discharge machine which improves the machining accuracy in particular at a corner portion of the workpiece.

A wire cut electrical discharge machine according to the present invention comprises a control device which corrects the change in the electrode side gap due to a change in the amount of removal in accordance with the information provided beforehand and the information indicative of a current machining position and current machining conditions thereby to improve the machining accuracy at a corner portion of the workpiece.

DESCRIPTION OF THE PREFERRED EMBODIMENTS

Figure 1:
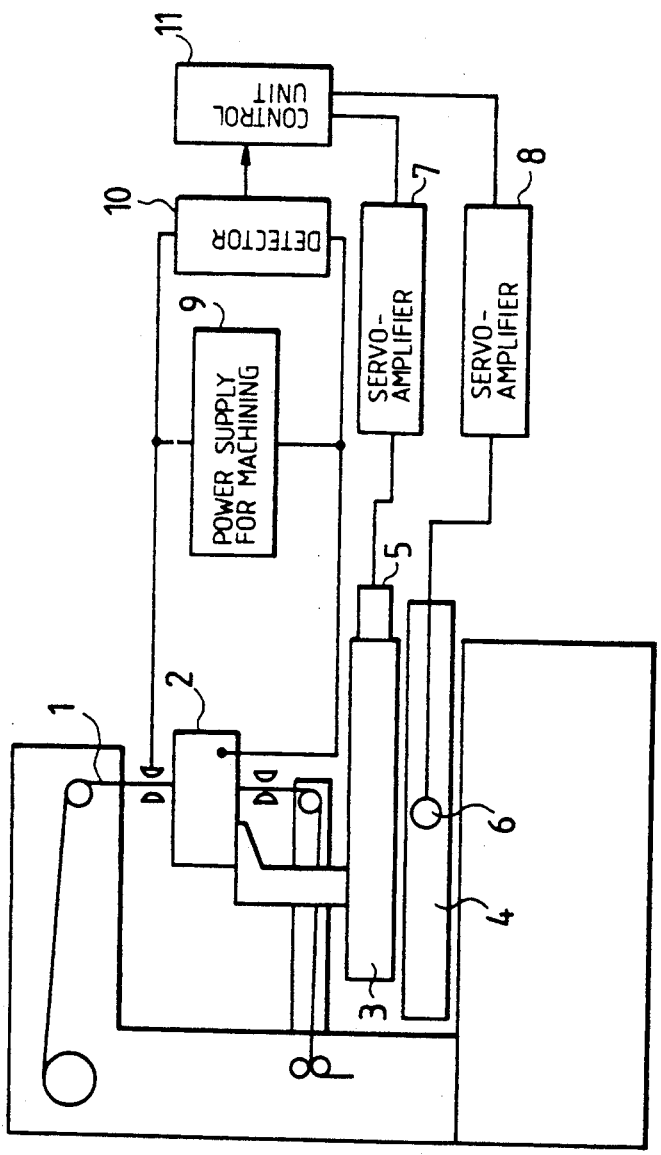
FIG. 1 is a schematic diagram showing an arrangement of a prior art wire cut electrical discharge machine.
Figure 2:
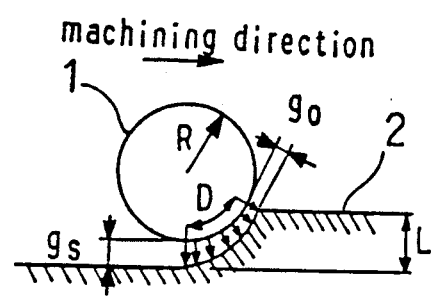
FIG. 2 is an enlarged view of a wire-form electrode and a workpiece during finishing.

Hereinafter, embodiments of the present invention will be described with reference to FIGS. 7, 8 and 9. In the Figures, the same reference numerals as in FIG. 1 refer to corresponding parts.

Figure 7:
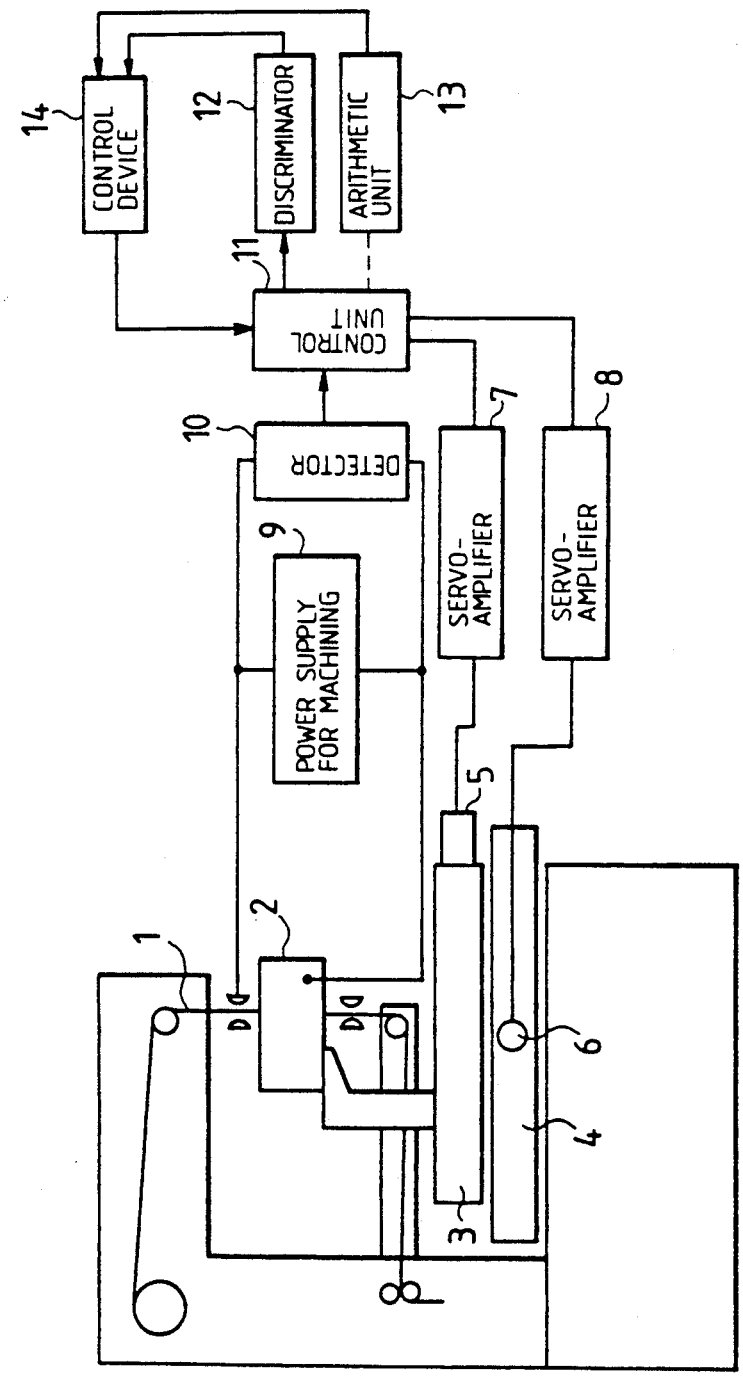
FIG. 7 is a schematic diagram showing an arrangement of a wire cut electrical discharge machine in accordance with an embodiment of the present invention.

First, in FIG. 7, reference numeral 12 designates a discriminator which discriminates whether or not the machining position is moving along a circular path at a corner portion of a workpiece 2. For example, the discriminator 12 discriminates depending on whether a command block of an NC program currently being executed is a linear interpolation command or a circular interpolation command. Reference numeral 13 designates an arithmetic unit for calculating a machining speed which is corrected with respect to a change in the amount of removal, and 14 designates a control device for changing over the machining speed in accordance with a signal from the discriminator 12 and a calculated result of the arithmetic unit 13. The above-mentioned discriminator 12, arithmetic unit 13, and control device 14 are operated actually in accordance with a task (software) of a microprocessor (CPU) within a control unit 11.

Next, the operation of this embodiment will be described. As in the prior art, the machining operation is performed by travelling a wire-form electrode 1 at a predetermined speed and by applying a pulse-shaped voltage between the wire-form electrode 1 and the workpiece 2 to produce a discharge therebetween. In this case, movement command signals are transmitted to servo-amplifiers 7 and 8 in accordance with a programmed locus provided to the control unit 11 beforehand, and servomotors 5 and 6 drive X-slider 3 and Y-slider 4 based on these signals to achieve the machining of the workpiece 2 to a desired shape. The control unit 11 drives the X-slider 3 and Y-slider 4 at optimum feed speeds in accordance with an average voltage between the poles (anode and cathode) detected by a detector 10 so that the machining clearance between the wire-form electrode 1 and the workpiece 2 is maintained at a constant value. A satisfactory geometry accuracy and face roughness are obtained by performing several face finishing operations after roughing As described in the foregoing, the geometry accuracy after finishing is determined by the electrode side gap, and hence it is important to maintain the electrode side gap at a constant value in order to achieve the shape machining with a high accuracy.

In the finishing operation, the discriminator 12 discriminates whether or not the current machining position is moving along a circular path at a corner portion of the workpiece 2. If it is moving along a circular path at the corner portion, a signal is transmitted to the control device 14 to operate the same. Further, in the arithmetic unit 13, a machining speed corrected with respect to a change in the amount of removal at the corner portion is calculated. The control device 14 in accordance with the signal received from the discriminator 12 and the calculated result of the arithmetic unit 13, controls the control unit 11 to change the actual machining speed and to return to the previous machining speed upon completion of the machining of the corner portion. For example, in the case of incorner machining, as described in the foregoing, since the overcut is caused due to the enlargement of the electrode side gap with the increase in the amount of removal L, the control device 14 changes over the machining speed to a larger value thereby to prevent the phenomenon in which the machining speed becomes too low at the incorner portion. As a result of this, the overcut due to the machining integral effect can be corrected.

In changing over the machining speed described above, a machining speed correction value table is prepared in a memory beforehand, and a machining speed command value is changed over based on the table in accordance with the calculated result of the arithmetic unit 13. In other words, a series of these operations are automatically carried out for all corner portions during the machining without requiring the change over of the machining speeds directly by the operator.

In the embodiment described above, the control unit 11, discriminator 12, arithmetic unit 13, and control device 14 are provided independently. However, these components may be replaced by a single control device if comparable functions can be performed by the single control device. Furthermore, in the above embodiment, an example of achieving the correction only at the incorner portion of the workpiece is described. However, it is possible to achieve the correction for both incorner and outcorner portions by providing a second discriminator which discriminates whether the corner to be machined is the incorner portion or the outcorner portion.

A second embodiment of the invention, which is more intricate than the first embodiment, will be described. In the second embodiment, the control unit 11, the discriminator 12, the arithmetic unit 13 and the control device 14 of the first embodiment are combined into one unit. The second embodiment further comprises a computerized numerical control device. (CNC).

A machining program including a plurality of blocks has been stored in an NC program memory in the main memory of the CNC. The machining program is to define a final configuration which is obtained by machining as shown in FIG. 8 for instance.

In a wire electrode type electric discharge machining method, a final configuration is not given to the workpiece by only one machining operation; that is, the machining operation is repeatedly carried out along the locus MP defined by the machining program, and finally a surface is formed with high accuracy. Let us consider the case where a workpiece is shaped as required by machining it three times. In this case, first the workpiece is machined in such a manner that the central axis of the wire electrode 1 is moved along the line which is spaced away by a predetermined offset value $h_1$ from the locus MP of the machining program (this machining operation) being called "a first cutting operation". Next, the, workpiece is machined in such a manner that the central axis of the wire electrode is moved along the line which is spaced apart by an offset value $h_2$, smaller than the offset value $h_1$, from the locus MP. Finally, the workpiece is finish-machined in such a manner that the central axis of the wire electrode 1 is moved along the line which is spaced apart by an offset value $h_3$, smaller than the offset value $h_2$, from the locus MP, so that a surface 20 which is substantially coincident with the machining program locus MP is formed.

Figure 8:
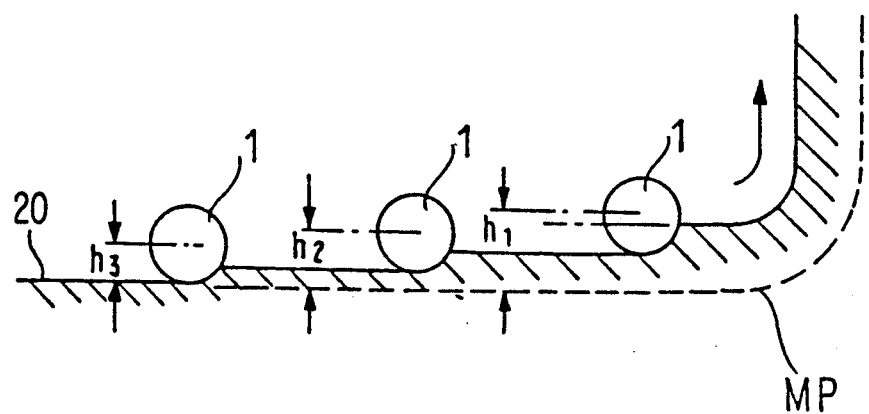
FIG. 8 is a schematic diagram illustrating a machining process according to the present invention.

FIG. 8 shows one example of an inside corner machining operation using the electric discharge machine of the invention. However, the preceding description is equally applied to the case of an outside corner.

Figure 9:
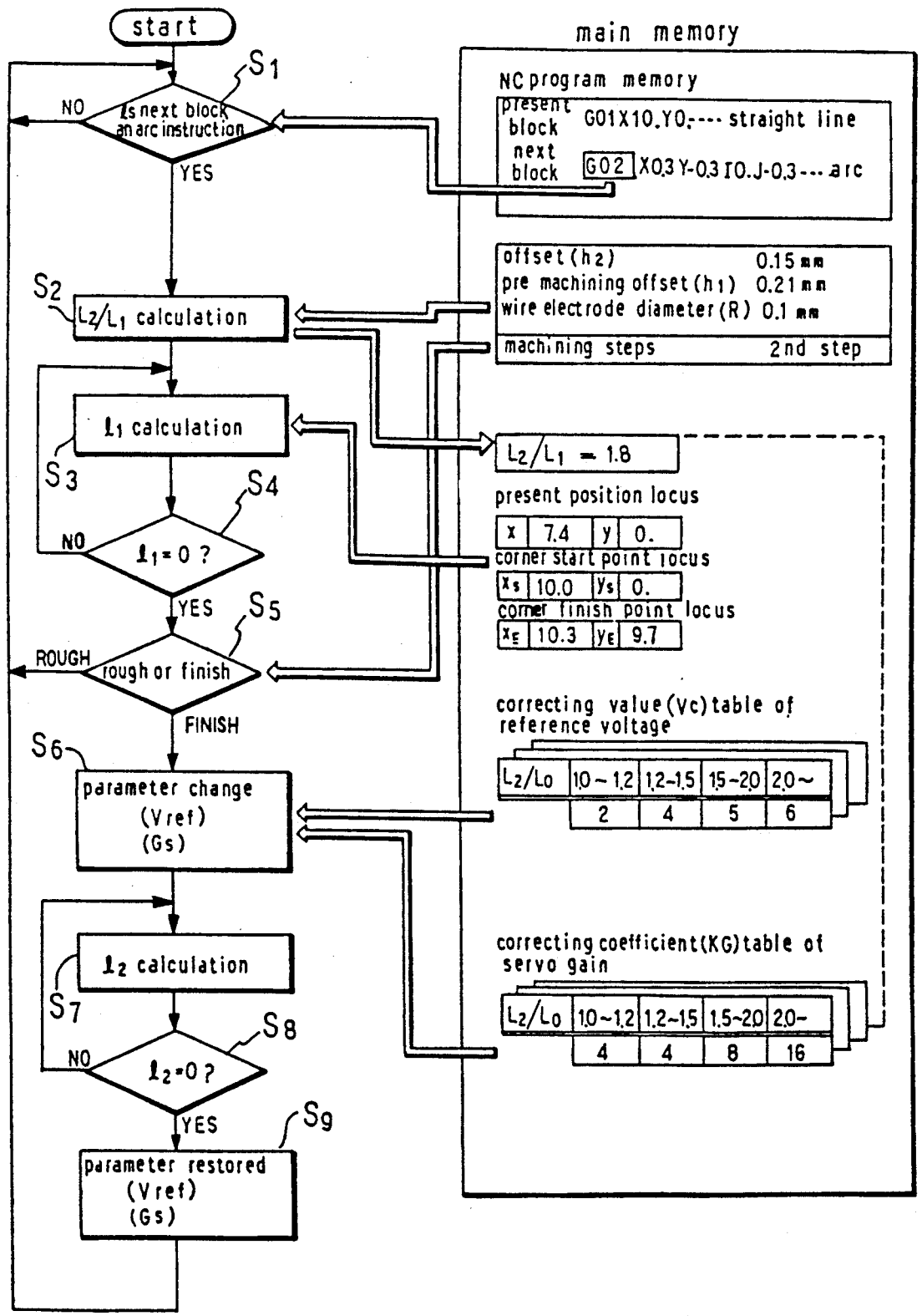
FIG. 9 is a flow charge showing an operation of a computerized numerical control device (CNC)

FIG. 9 is a diagram showing the operation of the CNC and data stored in the main memory MM. The operation of the CNC will be described.

When an electric discharge machining operation is started, in step $S_1$ it is determined whether or not the following machining block of the machining program includes an arc instruction; that is, it is determined whether or not a corner is involved. For instance when the program includes GO2, then it is determined that the block includes the arc instruction.

In the following step $S_2$, the change ratio of the amounts of removal ($L_2/L_1$) is calculated. In the expression $L_2/L_1$, $L_1$ and $L_2$ are the amounts of removal provided when the central axis of the wire electrode 1 comes to $O_1$ and $O_2$, respectively, as is clear from the part (a) of FIG. 4.

In step $S_3$, the distance $l_1$ between the present machining position and a corner start point is calculated. The distance can be readily obtained by comparison of the coordinates of the present machining position with those of the corner start point.

In step $S_4$, it is determined whether or not the distance $l_1$ is equal to zero (0). When it is determined that $l_1$ is equal to zero, step, $S_5$ is effected. In step $S_5$, it is determined whether the machining operation is a rough-machining operation or a finish-machining operation. In the case of FIG. 8 described above, the first machining operation is a rough-machining operation, and the last machining operation is a finish-machining operation. It is determined from the number of machining times stored in the main memory whether the machining operation is a rough-machining operation or a finish-machining operation.

When it is determined that the machining operation is a finish-machining operation, step $S_6$ is effected in which machining condition control parameters are changed.

In the case of FIG. 9, a data table of reference voltage and servo gain, control parameters to be corrected, is stored, and a correcting value $V_c$ or correcting coefficient $K_G$ is obtained from the amount of removal change ratio ($L_2/L_0$).

As is well known in the art, in the servo mechanism of the electric discharge machine, the gap between the wire electrode and the workpiece is controlled according to the difference between an average machining voltage $V_g$ applied actually between the electrodes and a reference average voltage $V_{ref}$ predetermined so that the two voltages become equal to each other Therefore, the interelectrode gap can be changed by controlling the servo reference voltage or gain as described above.

In step $S_6$, the reference average voltage $V_{ref}$ is adjusted (increased or decreased), and the servo gain $G_s$ is corrected by using the correcting coefficient.

In step $S_7$, the distance $l_2$ between the present machining position and a corner end point is calculated. In other words, the distance $l_2$ between the present machining position and the point $O_5$ in FIG. 4 is calculated.

In the next step $S_8$, it is determined whether or not the distance $l_2$ is zero (0). When it is determined that the distance $l_2$ is zero, machining the corner has been accomplished. Therefore, in step $S_9$ the control parameters are restored, and step $S_1$ is effected again.

Figure 4:
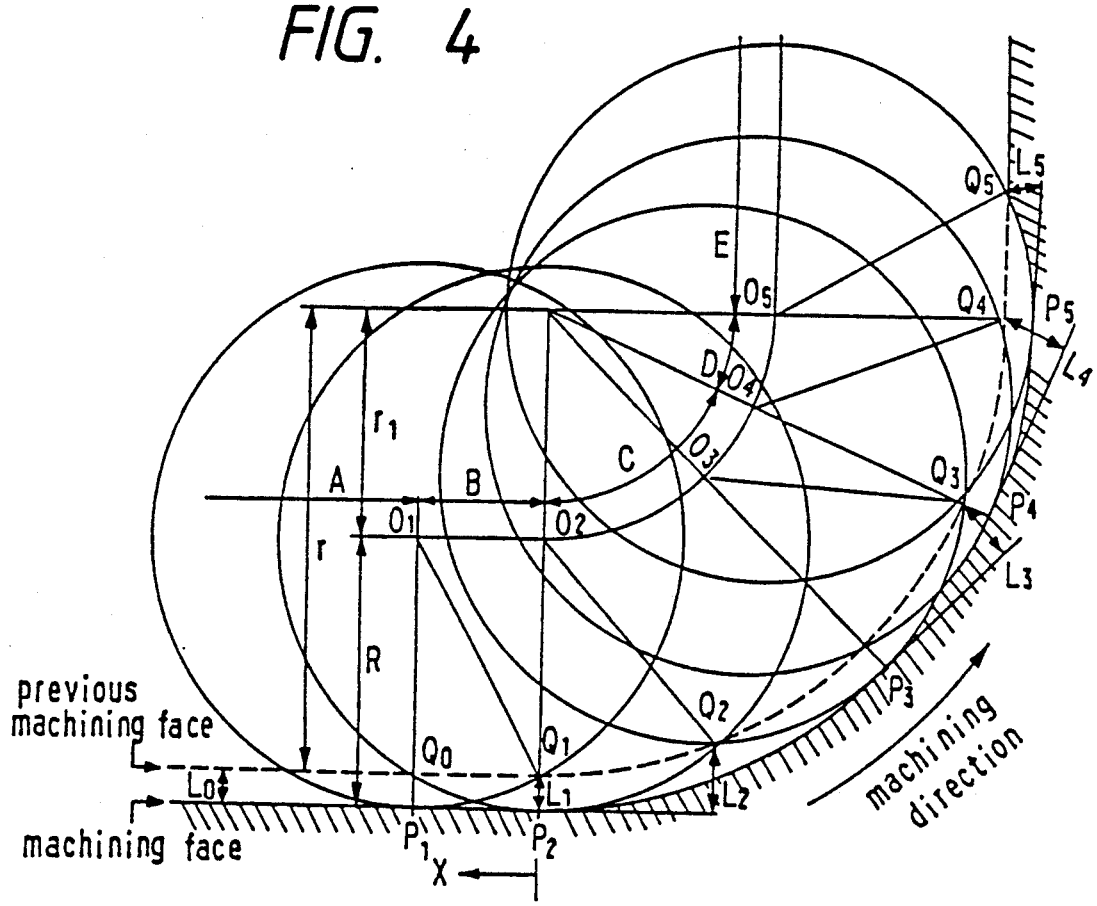
FIG. 4 is an enlarged view of the wire-form electrode and the workpiece during incorner finishing.
Figure 5:
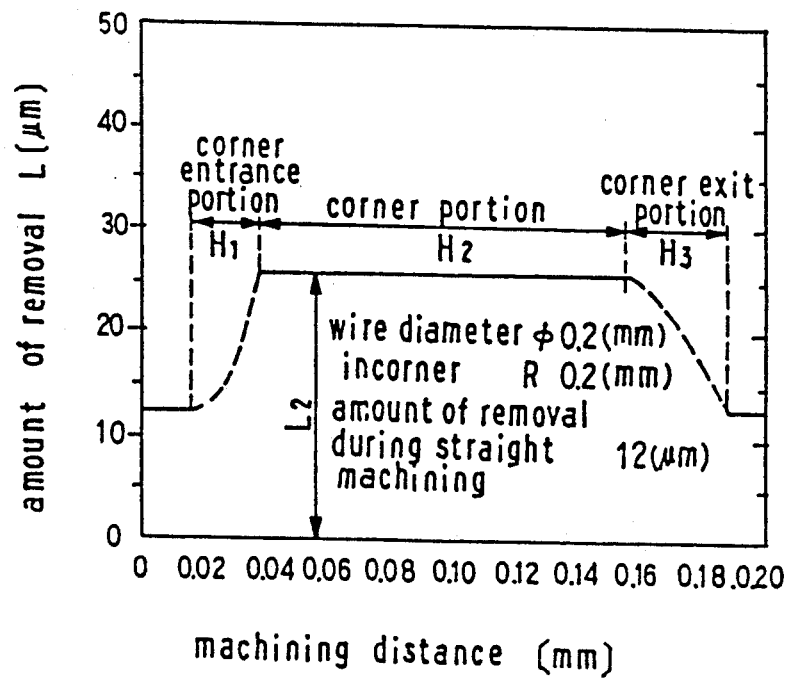
FIG. 5 is a graph showing a change in the amount of removal at the incorner portion of the workpiece.
Figure 6:
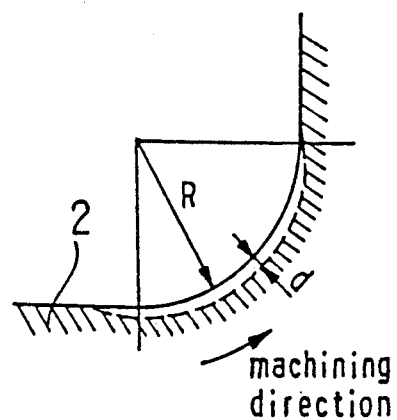
FIG. 6 is a schematic diagram showing overcut at the incorner portion of the workpiece.

Let us consider amounts of removal (L) in machining an inside corner as shown in FIG. 4 and FIG. 5. The amount of removal at the inside corner changes abruptly in the interval B (between $O_1$ and $O_2$) located before an arcuate locus to be followed by the wire electrode ($L_1 \rightarrow L_2$) and it is maintained constant in the arcuate movement interval C (between $O_2$ and $O_4$) ($L_2 = L_3 = L_4$). The machining operation is further continued, and the amount of removal is decreased in the interval D (between $O_4$ and $O_5$) located immediately before the end of the arc ($L_4 \rightarrow L_5$). The amount of removal is constant in the interval E which is a straight machining interval, being equal to the amount of removal ($L_5 = L_0$).

In the embodiment, in correspondence to the variation in the amount of removal ($L_1$ to $L_2$), the amount-of-removal change ratio ($L_2/L_1$) is calculated according to the data stored in the main memory MM before the wire electrode reaches the point $O_2$, in advance.

Figure 10:
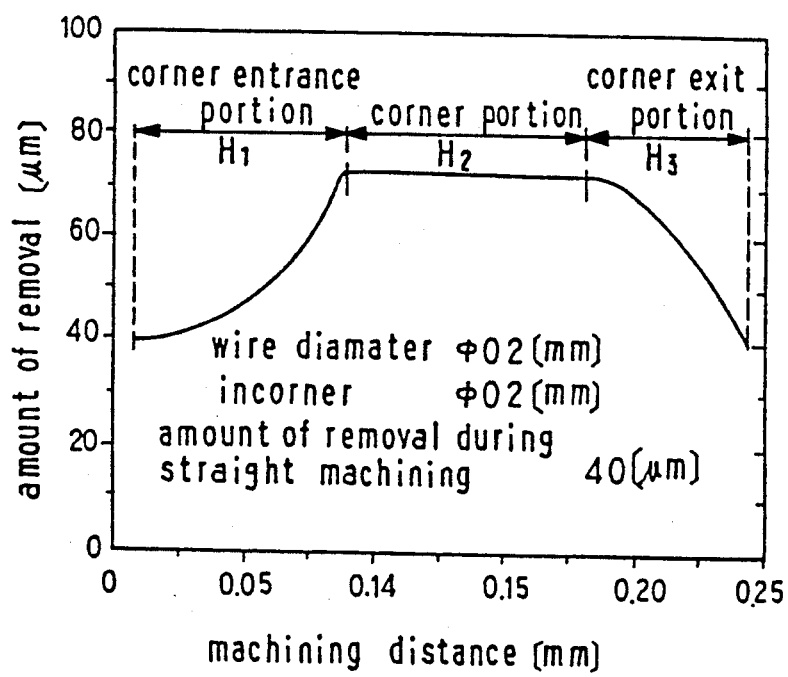
FIG. 10 is a diagram showing variations in the amount of removal of an inside corner.

FIG. 10 shows variations in the amount of removal of an inside corner which is machined with an amount of removal of 40 μm for a straight machining part with the second cutting operation taken into account (wire electrode 0.2 mm in diameter, and the inside corner 0.2 mm in radius). In this machining operation, the amount of removal starts to increase at a point about 80 μm before the start point of the corner, and it is constant, about 72 μm, while the corner is being machined. The amount of removal starts to decrease at a point about 65 μm before the end point of the corner, and finally it is returned to 40 μm and the straight machining operation is carried out again.

Figure 11:
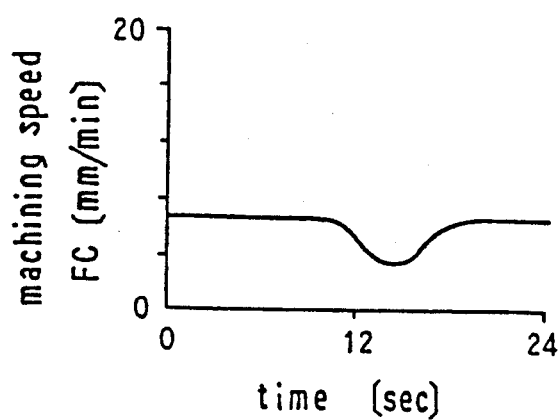
FIG. 11 is a diagram showing machining speeds (FC value) in the second cutting operation of an inside corner.

FIG. 11 shows machining speeds (FC values) in the second cutting operation of an inside corner. With electrical conditions maintained unchanged, the machining speed is substantially inversely proportional to the amount of removal. Therefore, FIG. 11 demonstrates that the amount of removal changes at the corner.

Figure 12:
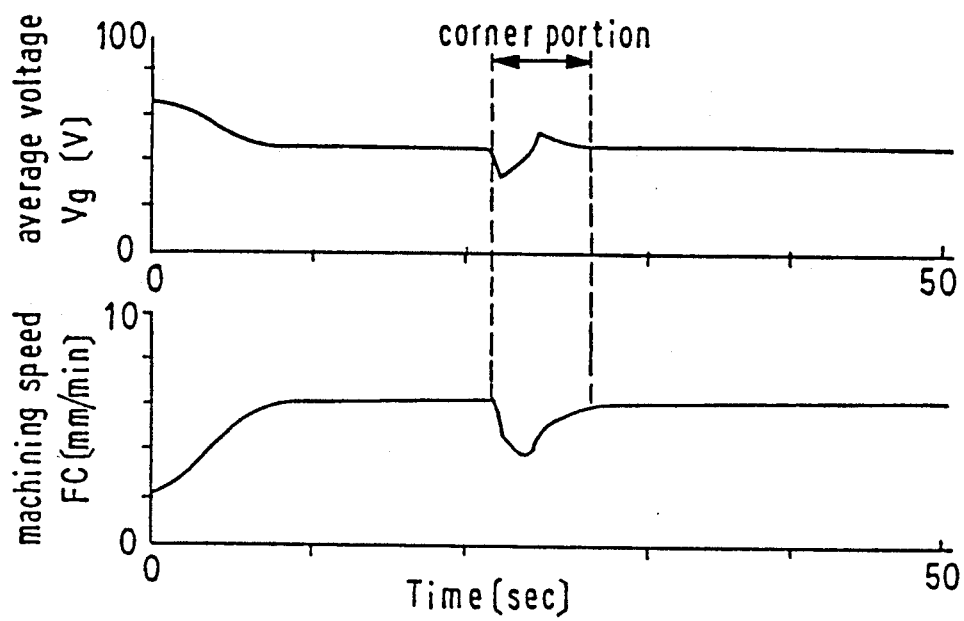
FIGS. 12 to 16 are graphical representations for a description of effects of the present invention.
Figure 13:
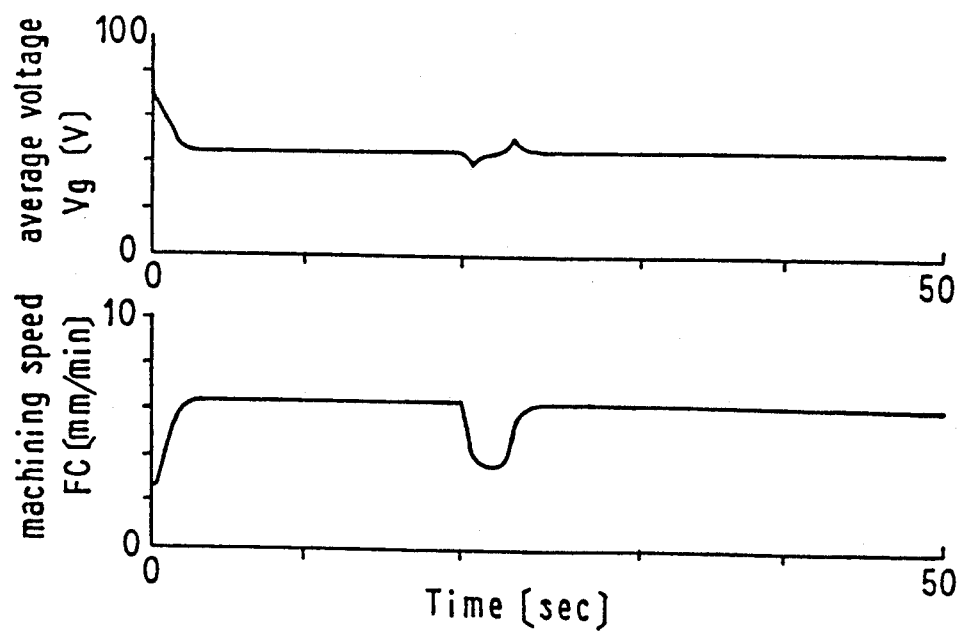

FIGS. 12 through 19 are graphical representations for a description of the effects of the invention. More specifically, FIG. 12 shows the conventional method in which at a corner part the servo gain is not corrected, and FIG. 13 shows the method of the invention in which the servo gain is corrected ($K_G = 4$). In both of FIGS. 12 and 13, the wire electrode is 0.2 mm in diameter, the corner radius is 0.2 mm, and the amount of removal $L_1$ of the straight part is 40 μm. As is apparent from FIGS. 12 and 13, when the servo gain is corrected at a corner part, the time constant at the rise or fall of the corner part machining speed is decreased; that is, the response characteristic of the machine to a corner part is improved. This tendency is significant especially near the machining end point of a corner.

Figure 14:
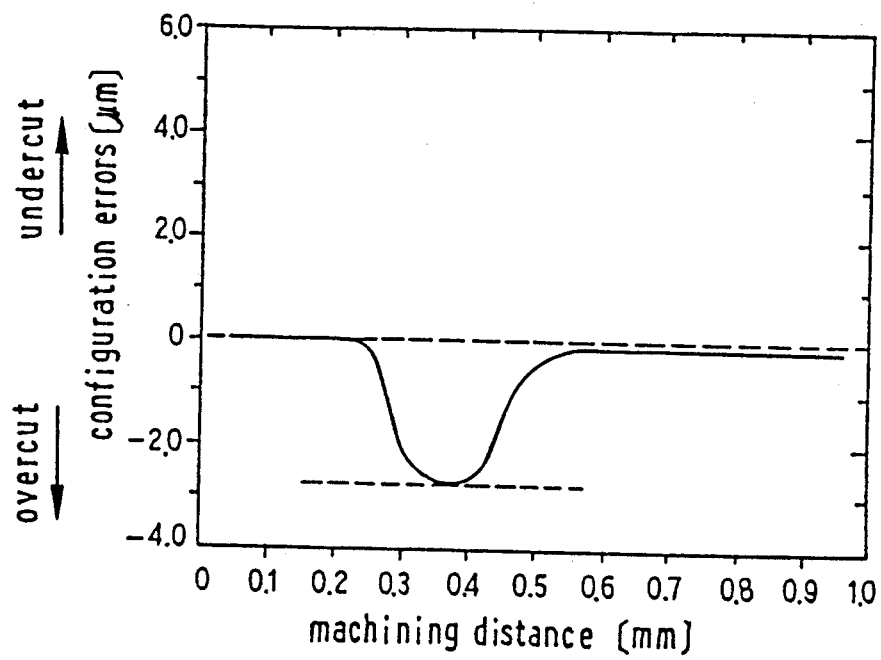
Figure 15:
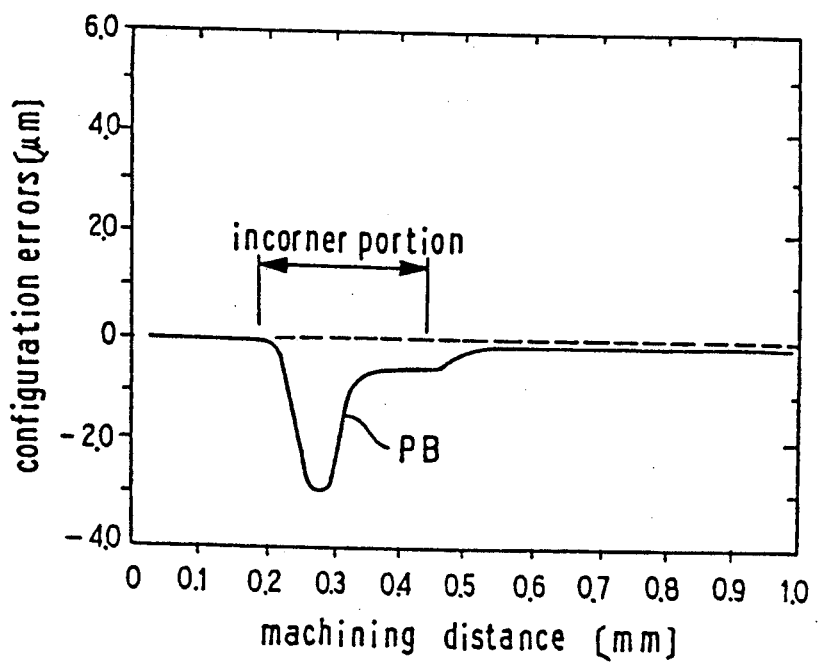

FIGS. 14 and 15 are to illustrate effects provided when the servo reference voltage is corrected for an inside corner. In other words, FIG. 14 shows the conventional method in which the reference voltage is not corrected, and FIG. 15 shows the method of the present invention. In both of FIGS. 14 and 15, the wire electrode is 0.2 mm in diameter, the corner radius is 0.2 mm, and the amount of removal $L_1$ of the straight part is 40 μm. In FIG. 15, the reference voltage correcting value is $V_c = 9(V)$. As is apparent from FIGS. 14 and 15, correction of the reference voltage greatly contributes to reduction of the amount of overcut. Starting the reference voltage correction at the amount-of-removal change start point (as indicated by the curve PB in FIG. 15) can reduce the configuration error.

Figure 16:
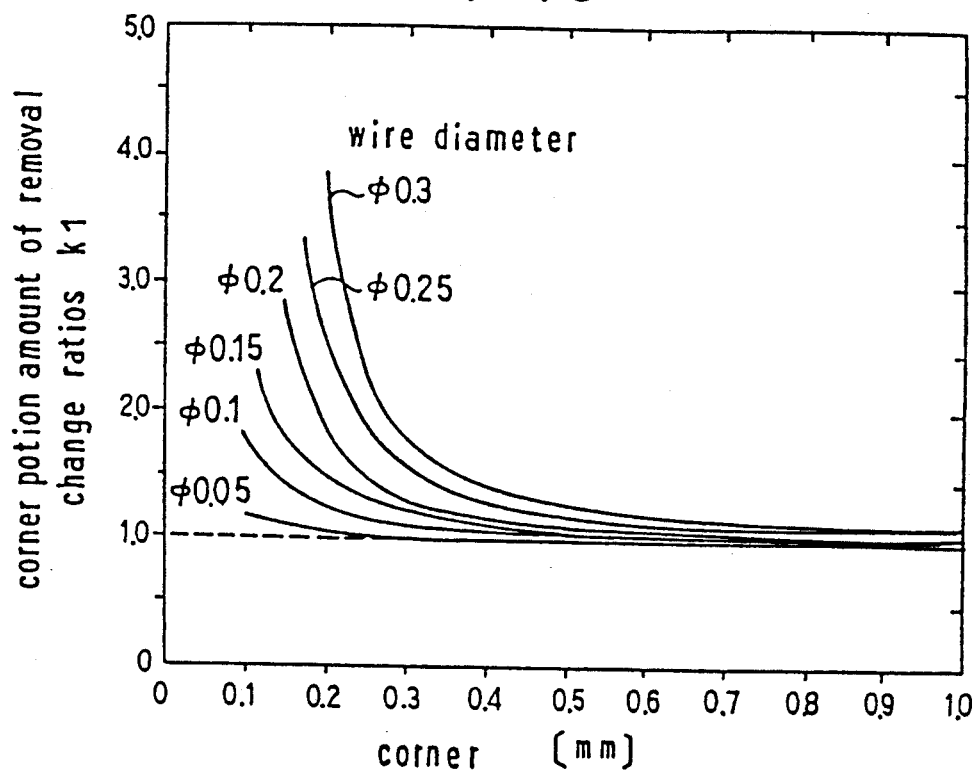

FIG. 16 is a graphical representation indicating inside corner radii (R) with corner portion amount-of-removal change ratios K1 ($L_2/L_1$) provided in the case where wire electrodes 0.05, 0.1, 0.15, 0.2, 0.25 and 0.3 mm in diameter are used, and the amount of removal for the straight part is set constant (12 μm). With any one of the wire electrodes, the corner part amount-of-removal change ratio ($L_2/L_1$) is inversely proportional to the inside corner radius (R). The tendency is increased with the diameter of the wire electrode. The amount-of-removal change affects the gap enlargement due to the integration effect, i.e., the configuration error.

Figure 17:
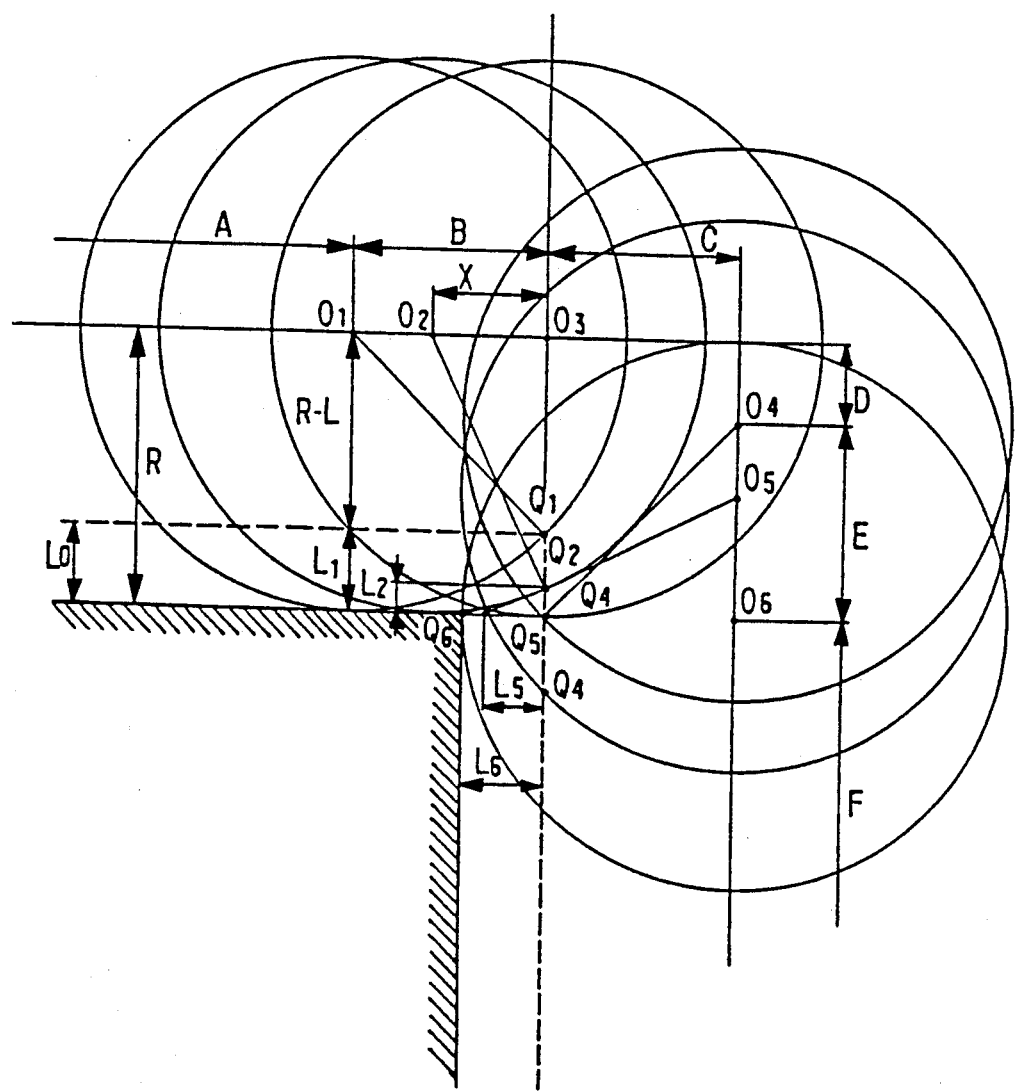
FIG. 17 is a diagram for a description of variations in the amount of removal at an outside corner.

FIG. 17 is a diagram for a description of the variation in the amount of removal at an outside corner.

At a sharp edge part, the amount of removal is constant when the central axis of the wire electrode is located in the interval A, and it is abruptly decreased when in the interval B ($O_1 \sim O_3$), and it is zero when at the position $O_3$. Furthermore, the amount of removal is maintained unchanged (i.e., zero when the central axis of the wire electrode is located in the intervals C and D $O_3 \sim O_4$), and it is abruptly increased when in the interval E($O_4 \sim O_6$) and it is restored to the straight part amount-of-removal $L_0$ when at the position $O_6$.

Figure 18:
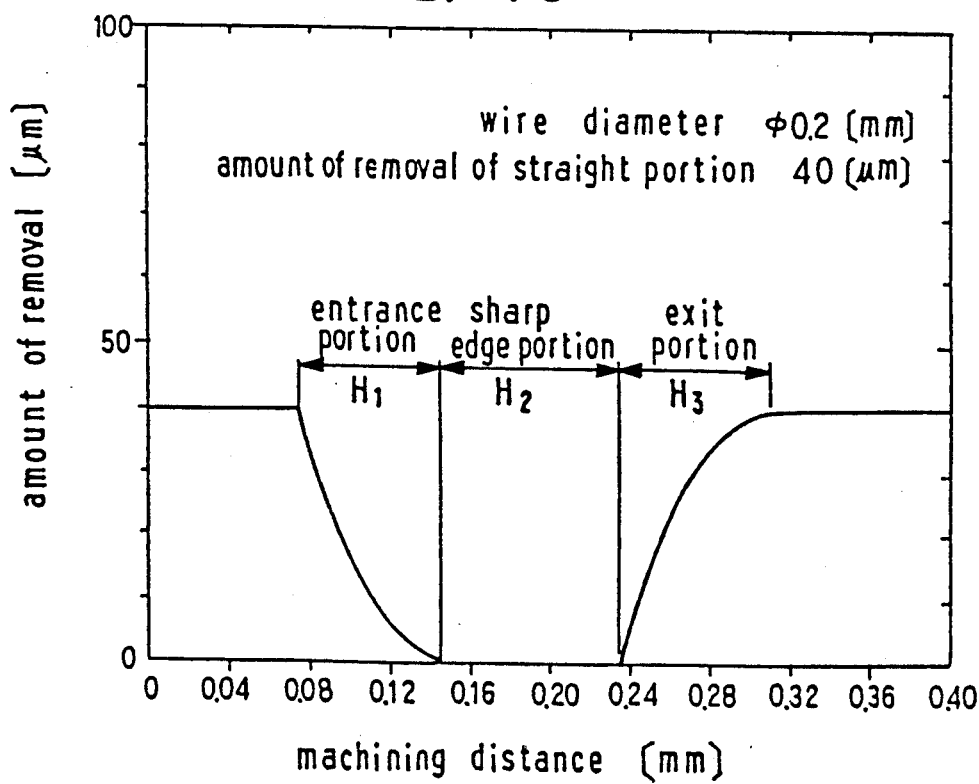
FIG. 18 is a diagram showing variations in the amount of removal at a sharp edge part.

FIG. 18 shows variations in the amount of removal at a sharp edge part which is machined with an amount of removal of 40 μm for a straight machining part with the second cutting operation taken into account (the wire electrode 0.2 mm in diameter). In this machining operation, the amount of removal starts decreasing at a point about 70 μm before the end point of the sharp edge part, and becomes zero at the end point of the sharp edge part. Then, the direction of movement of the wire electrode is changed. Thereafter, the amount of removal is decreased for the period of time for which the wire electrode is moved about 70 μm after reaching the end point of the sharp edge part, and it is restored to the straight part amount-of-removal 40 μm.

In the invention, the control parameters to be corrected may include not only the servo reference voltage and the servo gain in the above-described embodiment, but also the machining speed and offset value as described above, and those well known as machining electrical conditions such as an interelectrode voltage under no load, the peak value of an interelectrode current, and a pause period between successive electric discharge machining operations. The correcting values or coefficients of these control parameters are stored in the main memory MM in correspondence to the amount-of-removal change ratios ($L_2/L_1$).

Figure 19:
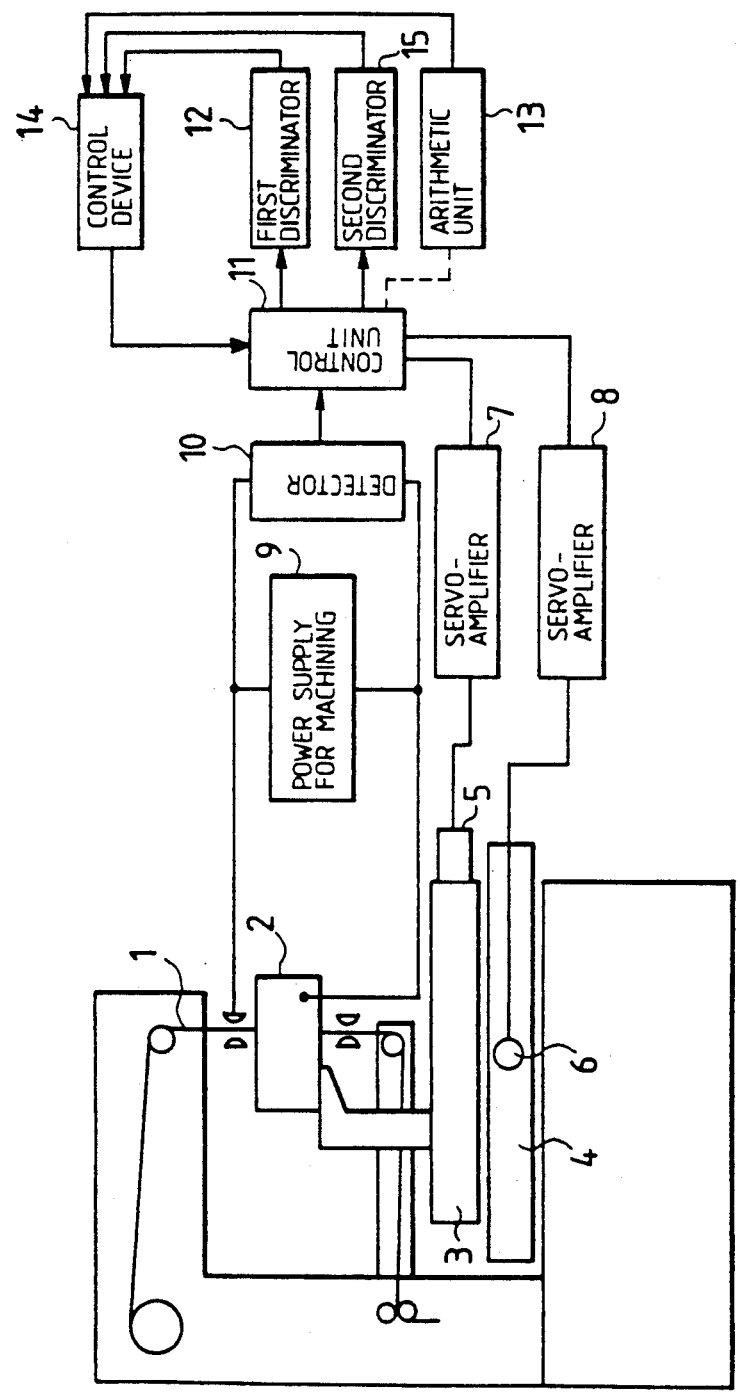
FIGS. 19 to 20 are schematic diagrams each showing the other embodiments of the present invention.

FIG. 19 illustrates a second embodiment of the present invention. In the Figure, reference numeral 15 designates a second discriminator which discriminates whether the machining operation to be performed is roughing or face finishing, and its output signal is supplied to a control device 14. In this embodiment, the second discriminator 15 is provided additionally, and, for example, the information as to the number of times that the machining operations including roughing are to be carried out is provided to a control unit 11 beforehand. The second discriminator 15 discriminates between the roughing and the face finishing by reference to the order of the current finishing operation in the series of the machining operations during the progress of the execution of the program. The second discriminator 15 transmits a signal to operate the control device 14 only when the face finishing is discriminated.

Figure 3:
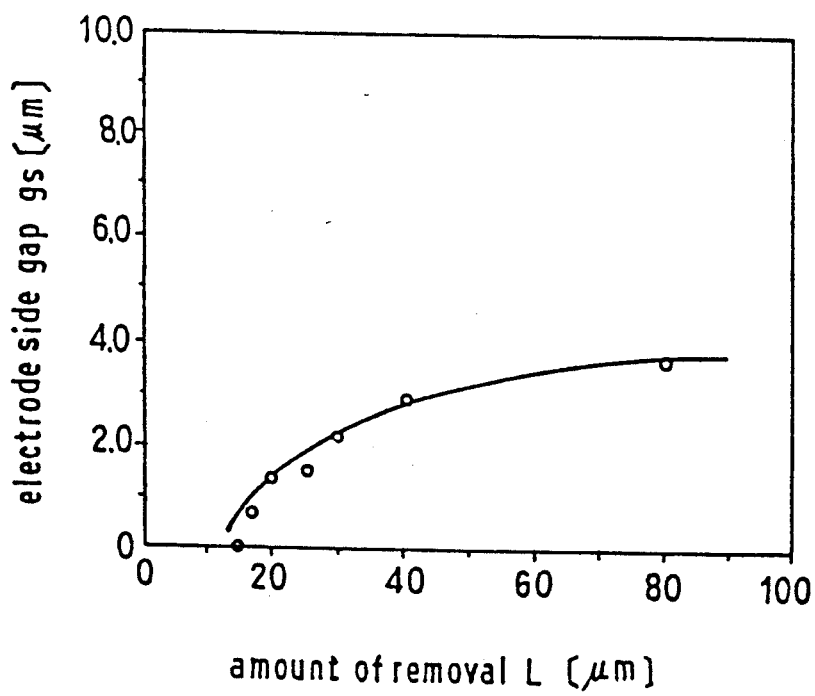
FIG. 3 is a graph showing a relationship between the amount of removal and the electrode side gap.
Figure 20:
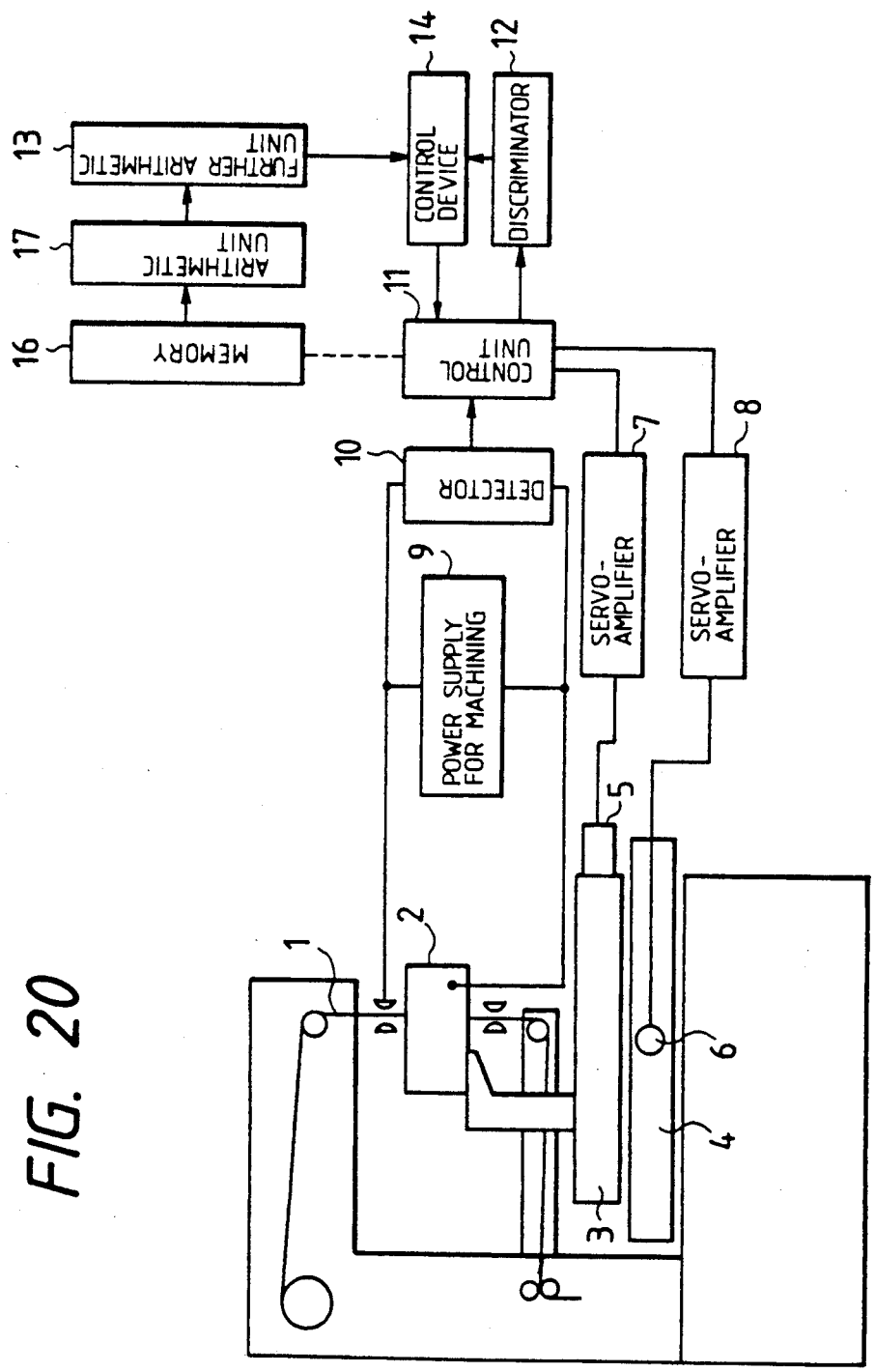

FIG. 20 illustrates a third embodiment of the present invention. In the Figure, reference numeral 16 designates a memory for storing the amount of removal in straight machining predicted beforehand, and 17 designates an arithmetic unit for calculating a change in the amount of removal at the corner portion of the workpiece 2 based on the information from the memory 16. In the memory 16, the magnitude of the discharge gap during straight machining operation for various machining conditions, and the amount of removal during the straight machining obtained from the amount of electrode shift (a difference between the offset at the face of the previous machining and the current offset) are stored. The arithmetic unit 17 calculates the amount of removal ($L_2$ in FIG. 3) at the corner portion based on the information from the memory 16 and other information including a corner radius, an electrode diameter, and the like. A further arithmetic unit 13 calculates, based on the calculated result of the arithmetic unit 17, a machining speed which is corrected with respect to a change in the amount of removal. A control device 14 controls a control unit 11 in accordance with a signal received from a discriminator 12, and the result from the arithmetic unit 13 to change over the actual machining speed, and then to return to the previous machining speed upon completion of the machining of the corner portion.

In the first to third embodiments mentioned above, the arithmetic unit 13 is described as performing the calculation of the machining speed which is corrected with respect to a change in the amount of removal at the corner portion. However, the arithmetic unit 13 may be arranged to perform the calculation of the amount of correction of a programmed locus at the corner portion, and furthermore, corresponding to this, the control device 14 may be arranged to control the movement of the corrected locus in accordance with the signals from the discriminators 12 and 15 and the calculated result from the arithmetic unit 13.

Moreover, in the third embodiment, the control device 14 may be arranged to change the machining electrical conditions and to change over the reference voltage and the gain of the interpole servo. Also in this arrangement, the object can be attained in substantially the same way. The control device which performs these change-over operations is arranged by an independent task (software) of the microprocessor (CPU). Furthermore, the change-over values are selected from a correction value table based on the radius of the corner portion.

In addition, the machining electrical conditions include a voltage $V_0$ between the anode and cathode under no-load condition, a peak current value $I_p$ (machining setting) flowing between the anode and cathode, a rest time OFF from the ending of the discharge until the voltage is applied again an average machining voltage $V_G$, etc. However, among these values, since the machining gap can be changed by changing the peak current value $I_p$, or the rest time OFF, a machining electrical condition correction table is prepared beforehand based on the radius of the corner portion. Thus, the correction of the machining gap is carried out at the corner portion by selecting and changing over the conditions in the table.

What is claimed is:

1. A wire cut electrical discharge machine which performs machining by applying a voltage between a wire-form electrode and a workpiece to produce a discharge therebetween, and by causing a relative movement between the wire-form electrode and the workpiece, the improvement comprising:
   a first discriminator for discriminating whether a machining position is moving along a circular path at a corner portion of said workpiece or not;
   an arithmetic unit for calculating a predetermined amount of correction with respect to a change in an amount of removal;
   a control device for correcting a change in an electrode side gap due to the change in said amount of removal in accordance with a signal from said first discriminator and a calculated result of said arithmetic unit; and
   a second discriminator for discriminating whether the corner portion to be machined is an incorner portion or an outcorner portion and for providing a discrimination signal to said control device.

2. A wire cut electrical discharge machine which performs machining by applying a voltage between a wire-form electrode and a workpiece to produce a discharge therebetween, and by causing a relative movement between the wire-form electrode and the workpiece, the improvement comprising:
   a first discriminator for discriminating whether a machining position is moving along a circular path at a corner portion of said workpiece or not;
   a first arithmetic unit for calculating a machining speed which is corrected with respect to a change in an amount of removal;
   a control device for changing over the machining speed in accordance with a signal from said first discriminator and a calculated result of said first arithmetic unit; and
   a second discriminator for discriminating whether the corner portion to be machined is an incorner portion or an outcorner portion and for providing a discrimination signal to said control device.

3. A wire cut electrical discharge machine according to claim 2 further comprising a third discriminator for discriminating whether the machining to be performed is roughing or face finishing, wherein said control device changes over the machining speed in accordance with the signal from said first discriminator, the signal from said second discriminator, a signal from said third discriminator and the calculated result of said first arithmetic unit.

4. A wire cut electrical discharge machine according to claim 2 further comprising a memory for storing an amount of removal in straight machining predicted beforehand, and a second arithmetic unit for calculating the amount of removal at the corner portion based on information from said memory, wherein said control device changes over the machining speed in accordance with the calculated result of said first arithmetic unit, a calculated result of said second arithmetic unit, and the signal from said first discriminator.

5. A wire cut electrical discharge machine which performs machining by applying a voltage between a wire-form electrode and a workpiece to produce a discharge therebetween, and by causing a relative movement between the wire-form electrode and the workpiece, the improvement comprising:
   a first discriminator for discriminating whether a machining position is moving along a circular path at a corner portion of said workpiece or not;
   a first arithmetic unit for calculating an amount of correction of a programmed locus at the corner portion with respect to a change in an amount of removal;
   a control device for controlling a movement of a corrected locus in accordance with a signal from said first discriminator and a calculated result of said first arithmetic unit; and
   a second discriminator for discriminating whether the corner portion to be machined is an incorner portion or an outcorner portion and for providing a discrimination signal to said control device.

6. A wire cut electrical discharge machine according to claim 5 further comprising a third discriminator for discriminating whether the machining to be performed is roughing or face finishing, wherein said control device controls the movement of the corrected locus in accordance with the signal from said first discriminator, the signal from said second discriminator, a signal from said third discriminator and the calculated result of said first arithmetic unit.

7. A wire cut electrical discharge machine according to claim 5 further comprising a memory for storing an amount of removal in straight machining predicted beforehand, and a second arithmetic unit for calculating a change in the amount of removal at the corner portion based on information from said memory, wherein said control device controls the movement of the corrected locus in accordance with the calculated result from said first discriminator, a calculated result from said second arithmetic unit, and the signal from said first discriminator.

8. A wire cut electrical discharge machine which performs machining by applying a voltage between a wire-form electrode and a workpiece to produce a discharge therebetween, and by causing a relative movement between the wire-form electrode and the workpiece, the improvement comprising:
   a first discriminator for discriminating whether a machining position is moving along a circular path at a corner portion of said workpiece or not;
   a memory for storing an amount of removal in straight machining predicted beforehand;
   an arithmetic unit for calculating a change in the amount of removal at the corner portion based on information from said memory;

a control device for changing over one of a gain and a reference voltage of an interpole servo in accordance with a calculated result of said arithmetic unit and a signal from said first discriminator; and a second discriminator for discriminating whether the corner portion to be machined is an incorner portion or an outcorner portion and for providing a discrimination signal to said control device.

9. A wire cut electrical discharge machine which performs machining by applying a voltage between a wire-form electrode and a workpiece to produce a discharge therebetween, and by causing a relative movement between the wire-form electrode and the workpiece, the improvement comprising:

a first discriminator for discriminating whether a machining position is moving along a circular path at a corner portion of said workpiece or not;

a memory for storing an amount of removal in straight machining predicted beforehand;

an arithmetic unit for calculating a change in the amount of removal at the corner portion based on information from said memory;

a control device for changing a machining electrical condition in accordance with a calculated result of said arithmetic unit and a signal from said first discriminator; and a second discriminator for discriminating whether the corner portion to be machined is an incorner portion or an outcorner portion and for providing a discrimination signal to said control device.

* * * * *